United States Patent
Moriguchi et al.

(10) Patent No.: US 8,251,167 B2
(45) Date of Patent: Aug. 28, 2012

(54) COOLING STRUCTURE FOR IN-WHEEL MOTOR

(75) Inventors: Naoki Moriguchi, Susono (JP);
Michitaka Tsuchida, Susono (JP);
Ryoji Mizutani, Nishikamo-gun (JP);
Junichiro Sakurai, Chiryu (JP); Yuki Tojima, Chita-gun (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 578 days.

(21) Appl. No.: 11/887,824

(22) PCT Filed: Apr. 12, 2006

(86) PCT No.: PCT/JP2006/308169
§ 371 (c)(1),
(2), (4) Date: Oct. 4, 2007

(87) PCT Pub. No.: WO2006/115133
PCT Pub. Date: Nov. 2, 2009

(65) Prior Publication Data
US 2009/0038865 A1 Feb. 12, 2009

(30) Foreign Application Priority Data

Apr. 22, 2005 (JP) .................. 2005-125232

(51) Int. Cl.
*B60K 7/00* (2006.01)
(52) U.S. Cl. ................... 180/65.51; 310/54
(58) Field of Classification Search .......... 180/65.1, 180/65.51; 310/52, 54, 60 R
See application file for complete search history.

(56) References Cited

U.S. PATENT DOCUMENTS

| | | | | |
|---|---|---|---|---|
| 5,014,800 A | * | 5/1991 | Kawamoto et al. | 180/65.51 |
| 5,111,090 A | | 5/1992 | Otake et al. | |
| 5,127,485 A | * | 7/1992 | Wakuta et al. | 180/65.51 |
| 5,156,579 A | | 10/1992 | Wakuta et al. | |
| 5,163,528 A | | 11/1992 | Kawamoto et al. | |
| 5,322,141 A | * | 6/1994 | Brunner et al. | 180/65.51 |
| 5,372,213 A | | 12/1994 | Hasebe et al. | |
| 5,735,364 A | * | 4/1998 | Kinoshita | 180/308 |
| 6,199,652 B1 | * | 3/2001 | Mastroianni et al. | 180/229 |
| 6,294,852 B1 | * | 9/2001 | Lee | 310/52 |
| 6,722,459 B1 | * | 4/2004 | Wendl et al. | 180/65.51 |
| 2005/0236198 A1 | * | 10/2005 | Jenkins | 180/65.5 |

FOREIGN PATENT DOCUMENTS

| | | |
|---|---|---|
| JP | A 03-150050 | 6/1991 |
| JP | A 04-185207 | 7/1992 |
| JP | A 04-185262 | 7/1992 |
| JP | A 11-115797 | 4/1999 |
| JP | A 2002-337554 | 11/2002 |
| JP | A 2003-504255 | 2/2003 |
| JP | A 2006-027310 | 2/2006 |

OTHER PUBLICATIONS

Sep. 21, 2010 Japanese Office Action issued in Japanese Patent Application No. 2005-125232 with English translation.

* cited by examiner

*Primary Examiner* — Frank Vanaman
(74) *Attorney, Agent, or Firm* — Oliff & Berridge, PLC

(57) ABSTRACT

A cooling structure for an in-wheel motor includes an in-wheel motor mounted within a wheel of a vehicle to drive the wheel or to be driven by the wheel, and an oil channel and a fin serving as "heat radiating portions" to facilitate cooling of the in-wheel motor. The in-wheel motor has a case serving as a "housing". The "heat radiating portion" is located apart from the case.

5 Claims, 10 Drawing Sheets

COOLING STRUCTURE FOR IN-WHEEL MOTOR

TECHNICAL FIELD

The present invention relates to a cooling structure for an in-wheel motor, and more particularly, to a cooling structure for an in-wheel motor having a heat radiating portion provided apart from a housing of the in-wheel motor.

BACKGROUND ART

An in-wheel motor as a drive unit for a vehicle has conventionally been known. Such an in-wheel motor is described for example in Japanese Patent Laying-Open No. 2002-337554 or the like. In the above description, the in-wheel motor is connected to a torsion beam via a bracket.

However, the in-wheel motor as described above has a problem as described below.

At least a portion of the in-wheel motor is provided within a wheel. To reduce air resistance, a vehicle may be designed to have less airflow within a wheel even when the vehicle is moving. As a result, the in-wheel motor does not receive sufficient wind, and thus cooling efficiency of the motor is reduced.

DISCLOSURE OF THE INVENTION

One object of the present invention is to provide a cooling structure for an in-wheel motor having a high cooling efficiency.

A cooling structure for an in-wheel motor in accordance with the present invention includes an in-wheel motor having at least a portion thereof mounted within a wheel of a vehicle to drive the wheel or to be driven by the wheel, and a heat radiating portion to facilitate cooling of the in-wheel motor. The in-wheel motor has a housing, and the heat radiating portion is located apart from the housing.

With the arrangement described above, the heat radiating portion contributing to the cooling of the in-wheel motor can be provided at a location having a relatively good cooling condition, and thus cooling efficiency of the in-wheel motor can be improved.

Preferably, in the cooling structure for the in-wheel motor, the in-wheel motor is assembled to the vehicle via a fixing member, and the heat radiating portion includes a cooling fin provided to the fixing member.

With the arrangement described above, heat radiation via the fixing member can be enhanced, improving the cooling efficiency of the in-wheel motor.

Preferably, in the cooling structure for the in-wheel motor, a contact surface between the housing and the fixing member is provided with a portion having protrusions to increase a contact area.

With the arrangement described above, heat transfer from the housing of the in-wheel motor to the fixing member can have an improved efficiency. Consequently, the heat radiation via the fixing member can further be enhanced, improving the cooling efficiency of the in-wheel motor.

Preferably, in the cooling structure for the in-wheel motor, the in-wheel motor has a cooling medium channel having at least a portion thereof provided to pass through an outside of the housing, and the heat radiating portion includes the portion of the cooling medium channel located outside the housing.

With the arrangement described above, a cooling medium contributing to the cooling of the in-wheel motor can flow outside the housing. Consequently, heat radiation from the cooling medium can be enhanced, improving the cooling efficiency of the in-wheel motor by the cooling medium.

Preferably, in the cooling structure for the in-wheel motor, the in-wheel motor is assembled to the vehicle via a fixing member, and the cooling medium channel goes through an inside of the fixing member.

With the arrangement described above, the heat radiation from the cooling medium can further be enhanced. As a result, the cooling efficiency of the in-wheel motor by the cooling medium can be improved.

Preferably, in the cooling structure for the in-wheel motor, by way of example, the in-wheel motor is fixed to an intermediate beam of the vehicle via a fixing member.

In a fixing structure for an in-wheel motor using an intermediate beam and a fixing member, the in-wheel motor is likely to receive less cooling wind, and thus cooling efficiency of the in-wheel motor tends to be reduced. In contrast, the above cooling structure can perform effective heat radiation when applied.

According to the present invention, the cooling efficiency of the in-wheel motor can be improved as described above.

BEST MODES FOR CARRYING OUT THE INVENTION

Figure 1:
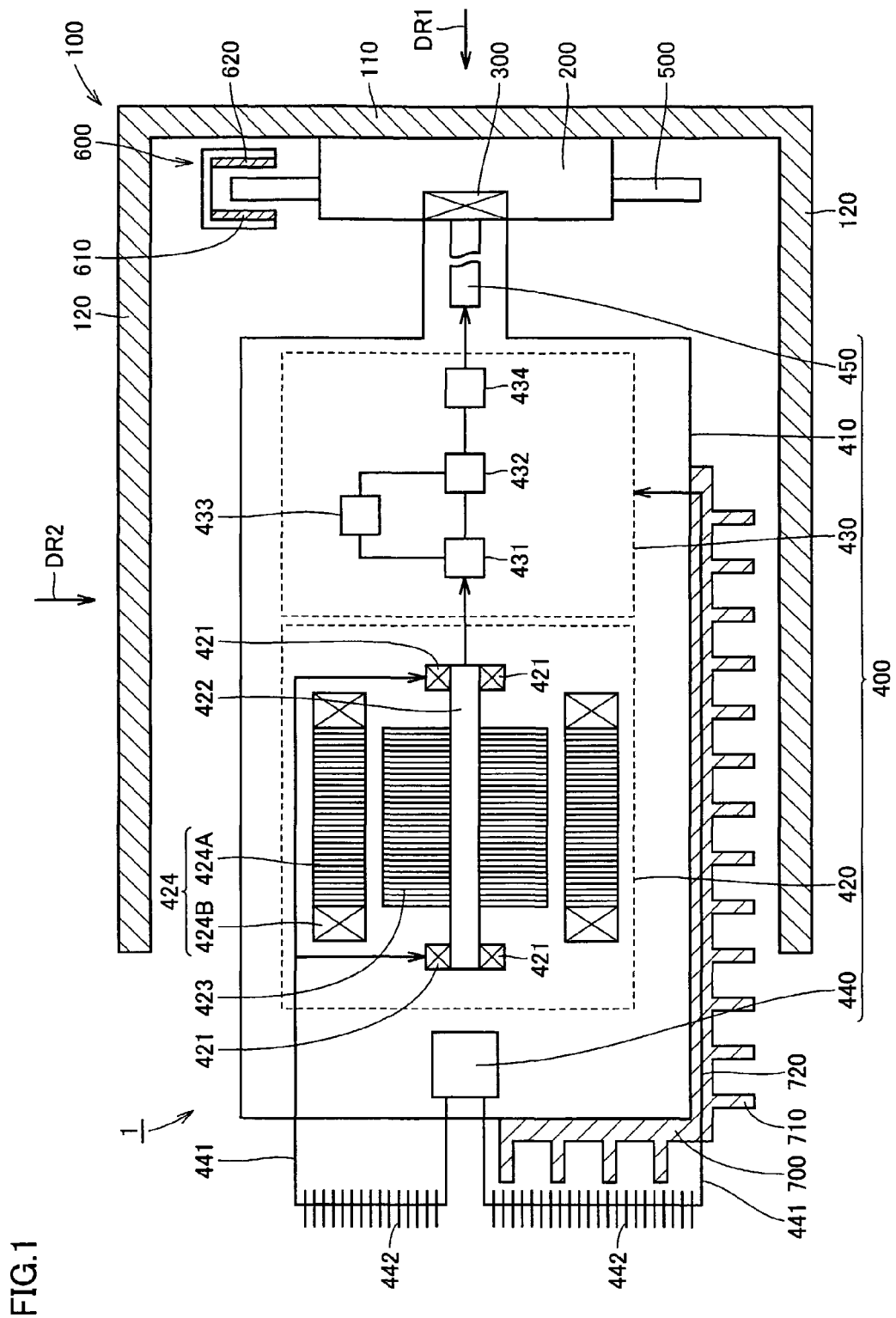
FIG. 1 is a block diagram showing an electrically driven wheel including a cooling structure for an in-wheel motor in accordance with first to third embodiments of the present invention.

Hereinafter, embodiments of a cooling structure for an in-wheel motor in accordance with the present invention will be described. In the description below, identical reference numerals refer to identical or corresponding parts, and a detailed description thereof may not be repeated.

FIG. 1 is a block diagram showing an arrangement of an electrically driven wheel including a cooling structure for an in-wheel motor in accordance with first to third embodiments which will be described later. Referring to FIG. 1, an electrically driven wheel 1 includes a wheel disc 100 and a wheel hub 200 serving as a "wheel", a joint 300, an in-wheel motor 400, a brake rotor 500, a brake caliper 600, a mounting bracket 700 serving as a "fixing member", and a tire (not shown).

In-wheel motor 400 includes a case 410 serving as a "housing", a motor 420, a planetary gear 430 serving as a reduction mechanism, an oil pump 440, and a shaft 450. In-wheel motor 400 drives wheel disc 100 and wheel hub 200, or is driven by wheel disc 100 and wheel hub 200.

Wheel disc 100 is substantially shaped like a cup, and has a disc portion 110 and a rim portion 120. The tire (not shown) is fixed on the outer edge of rim portion 120 of wheel disc 100. Wheel disc 100 is formed to accommodate wheel hub 200, a portion or whole of in-wheel motor 400, brake rotor 500, and brake caliper 600. Wheel disc 100 is assembled to a vehicle from a direction indicated by an arrow DR1, and coupled with wheel hub 200 by fastening disc portion 110 to wheel hub 200 with a hub bolt.

Wheel hub 200 is coupled to shaft 450 of in-wheel motor 400 via joint 300.

Brake rotor 500 is disposed such that its inner peripheral end is fixed to an outer peripheral end of wheel hub 200 and its outer peripheral end passes through within brake caliper 600. Brake caliper 600 includes a brake piston and brake pads 610 and 620. Brake pads 610 and 620 sandwich the outer peripheral end of brake rotor 500.

When brake oil is supplied to brake caliper 600, the brake piston moves to the right side of the drawing, pushing brake pad 610 to the right side of the drawing. In response to brake pad 610 moving to the right side of the drawing, brake pad 620 moves to the left side of the drawing. Thereby, brake pads 610 and 620 sandwich the outer peripheral end of brake rotor 500 to brake electrically driven wheel 1.

Next, an arrangement of in-wheel motor 400 will be described.

Case 410 is disposed on the on the left side of wheel hub 200 in the drawing, completely accommodating motor 420, planetary gear 430, oil pump 440, a portion of the shaft 450, and a portion of an oil channel.

Motor 420 has a bearing 421, a rotary shaft 422, a rotor 423, and a stator 424. Stator 424 includes a stator core 424A and a stator coil 424B. Stator core 424A is fixed to case 410. Stator coil 424B is wound on stator core 424A. When motor 420 is a three-phase motor, stator coil 424B is formed of a U-phase coil, a V-phase coil, and a W-phase coil. Rotor 423 is disposed on the inner peripheral side of stator core 424A and stator coil 424B.

Planetary gear 430 includes a sun gear 431, a pinion gear 432, a ring gear 433, and a planetary carrier 434.

A sun gear shaft (not shown) is coupled to rotary shaft 422 of motor 420. Further, the sun gear shaft is rotatably supported. Sun gear 431 is coupled to the sun gear shaft. Pinion gear 432 engages sun gear 431 and is rotatably supported. Ring gear 433 is fixed to case 410. Planetary carrier 434 is coupled to pinion gear 432. Further, planetary carrier 434 is splined and engaged to shaft 450. Further, planetary carrier 434 is rotatably supported.

Oil pump 440 pumps up oil in an oil pan, and supplies the pumped oil to an oil channel 441 serving as a "cooling medium channel". A portion of oil channel 441 passes through the outside of case 410. The portion of the "cooling medium channel" located outside case 410 constitutes a "heat radiating portion" to facilitate cooling of in-wheel motor 400. Specifically, oil channel 441 as the "heat radiating portion" is formed apart from case 410, and the portion of oil channel 441 located outside case 410 is provided with a fin 442 (cooling fin).

In-wheel motor 400 is assembled to the vehicle via mounting bracket 700. Bracket 700 is provided with a fin 710 (cooling fin) serving as a "heat radiating portion". Further, bracket 700 is provided with an oil channel 720 serving as a "cooling medium channel". Oil channel 720 is in communication with oil channel 441.

When a switching circuit (not shown) mounted in the vehicle supplies an alternating current to stator coil 424B, rotor 423 rotates and motor 420 outputs a predetermined torque. The output torque of motor 420 is transferred to planetary gear 430 via the sun gear shaft. Planetary gear 430 changes the output torque received from the sun gear shaft using sun gear 431 and pinion gear 432, that is, alters (reduces) the speed, for output to planetary carrier 434. Planetary carrier 434 transfers the output torque of planetary gear 430 to shaft 450, and shaft 450 rotates wheel hub 200 and wheel disc 100 via joint 300 at a predetermined number of revolutions. Thereby, electrically driven wheel 1 rotates at a predetermined number of revolutions.

On the other hand, oil pump 440 pumps up the oil from the oil pan, and supplies the pumped oil to oil channel 441 as described above. The oil entering oil channel 441 is supplied for example to bearing 421 and planetary gear 430 to lubricate them. The oil is supplied from oil channel 441 to each portion within case 410 via oil channel 720 formed in mounting bracket 700. Further, the oil cools stator coil 424B and the like. Specifically, the oil constitutes a "cooling medium" contributing to the cooling of in-wheel motor 400.

It is important to enhance heat radiating property of in-wheel motor 400 when it is driven. Generally, in terms of reducing air resistance while a vehicle is moving, it is preferable to employ a structure having less airflow into a wheel during the moving. However, this may act disadvantageously in terms of enhancing the heat radiating property of in-wheel motor 400. Although a fin for facilitating cooling may be provided to case 410 itself of in-wheel motor 400, a sufficient cooling effect may not necessarily be obtained due to the reason described above. Further, particularly when electrically driven wheel 1 in accordance with the present embodiment is used for example as a rear wheel of a vehicle, a structure having less airflow into a wheel while a vehicle is moving tends to be employed, and thus it is more important to facilitate the cooling of in-wheel motor 400.

Electrically driven wheel 1 shown in FIG. 1 is provided with oil channels 441 and 720 and fins 442 and 710 disposed apart from case 410 and serving as the "heat radiating portions" to facilitate the cooling of in-wheel motor 400. Details of the cooling structure including these "heat radiating portions" will be described in the first to third embodiments which will be described later.

Figure 2:
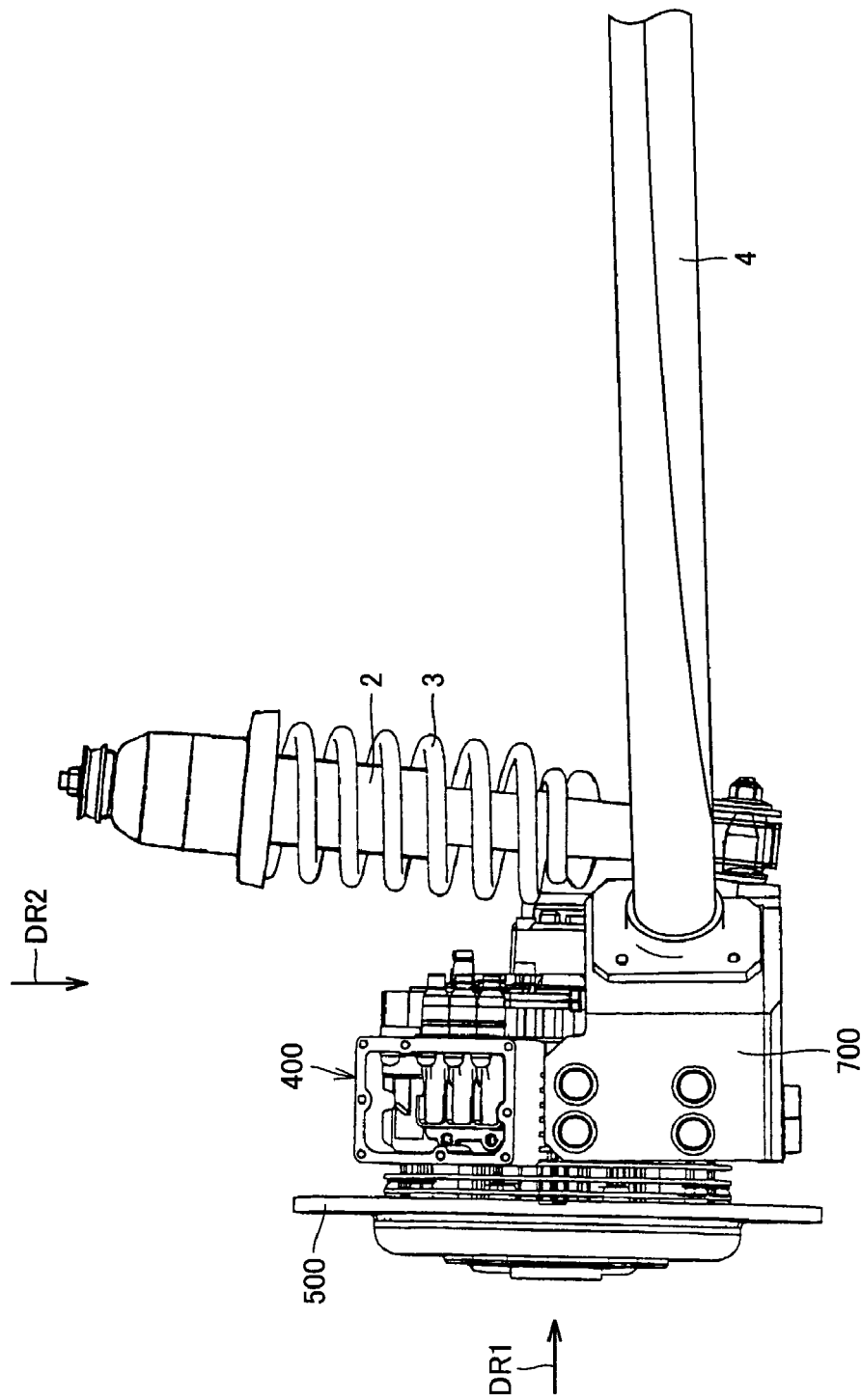
FIG. 2 shows a state of a surrounding structure of the in-wheel motor shown in FIG. 1 when seen from the front side of a vehicle.
Figure 3:
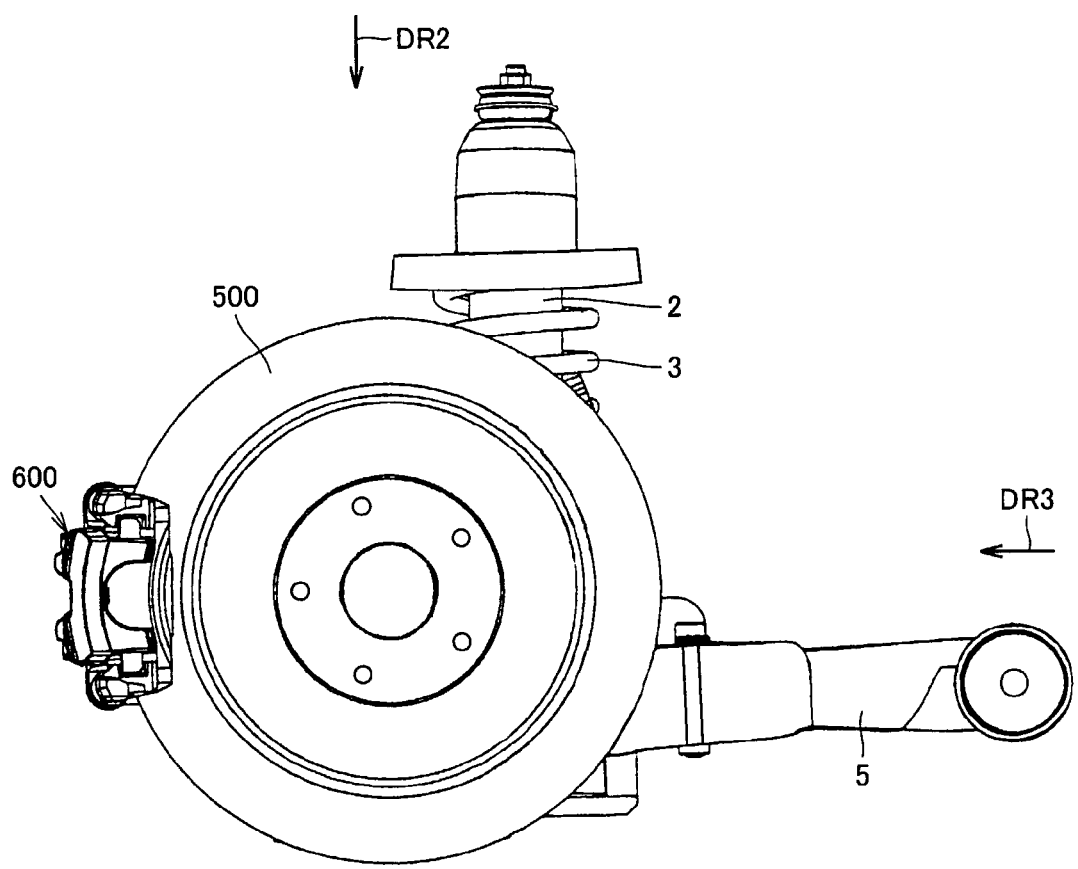
FIG. 3 shows a state of the surrounding structure of the in-wheel motor shown in FIG. 1 when seen from the outside of a lateral side of the vehicle.
Figure 4:
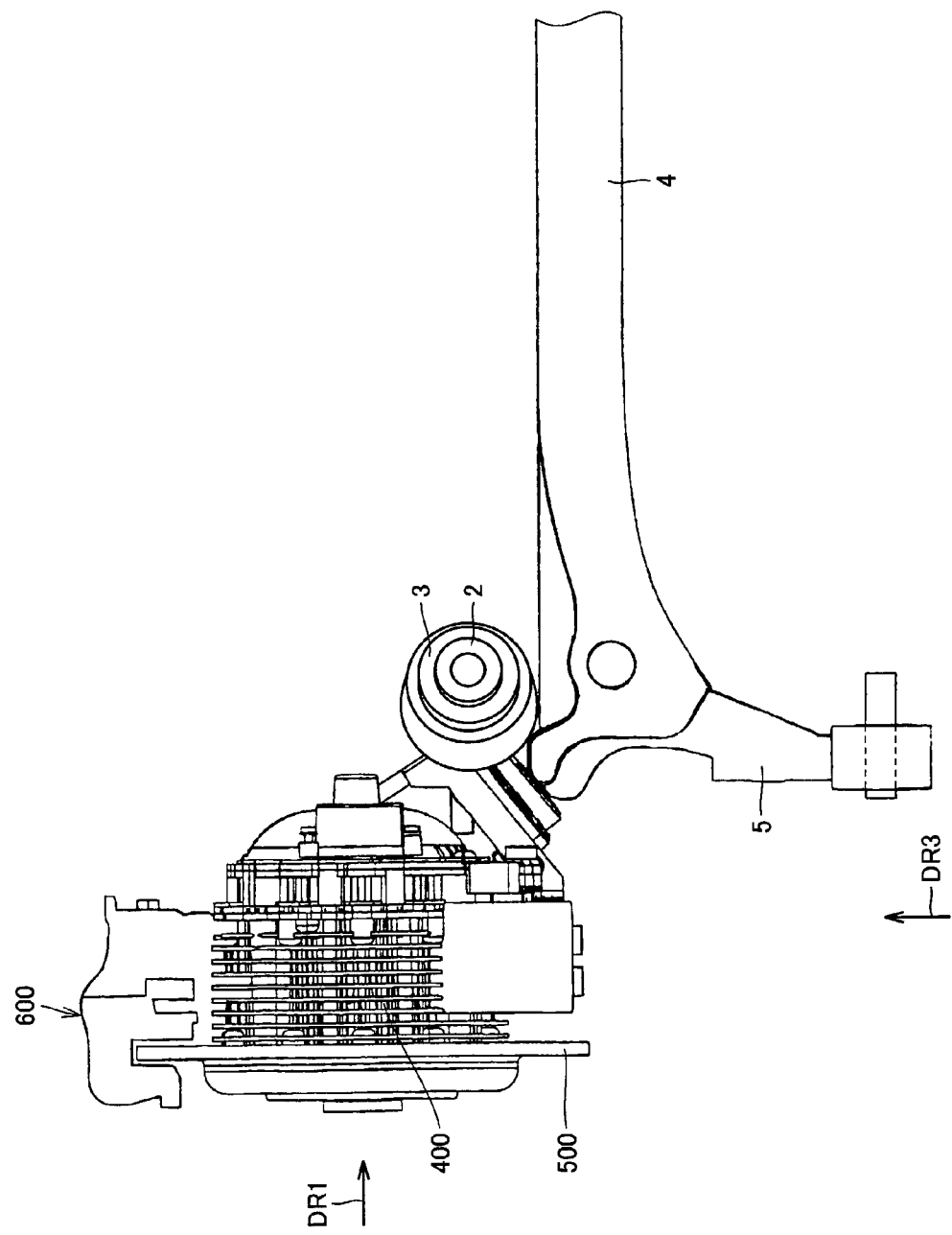
FIG. 4 shows a state of the surrounding structure of the in-wheel motor shown in FIG. 1 when seen from the top side of the vehicle.

FIGS. 2 to 4 show a surrounding structure of in-wheel motor 400 shown in FIG. 1. Here, FIG. 2 shows a state of the surrounding structure when seen from the front side of a vehicle (from a direction indicated by an arrow DR3), FIG. 3 shows a state of the surrounding structure when seen from the outside of a lateral side of the vehicle (from the direction indicated by arrow DR1), and FIG. 4 shows a state of the surrounding structure when seen from the top side of the vehicle (from a direction indicated by an arrow DR2). It is to be noted that FIGS. 2 to 4 do not show the "heat radiating portion" shown in FIG. 1.

Referring to FIGS. 2 to 4, in-wheel motor 400 in electrically driven wheel 1 is assembled to a wheel supporting unit via mounting bracket 700. The wheel supporting unit has a shock absorber 2, a spring 3, an intermediate beam 4, and a trailing arm 5. Intermediate beam 4 is provided between a pivot of trailing arm 5 and an axle of electrically driven wheel 1. In-wheel motor 400 in another electrically driven wheel is assembled to the other end (not shown) of intermediate beam 4.

By fixing in-wheel motor 400 using mounting bracket 700 as described above, in-wheel motor 400 can be assembled to a vehicle while readily avoiding interference with shock absorber 2 and spring 3 in a fixing structure including intermediate beam 4.

It is to be noted that, in the fixing structure for in-wheel motor 400 using intermediate beam 4 and mounting bracket 700, cooling wind toward in-wheel motor 400 is blocked by mounting bracket 700, and thus in-wheel motor 400 tends to receive less wind. Therefore, the importance of facilitating the cooling of in-wheel motor 400 further increases.

First Embodiment

Figure 5:
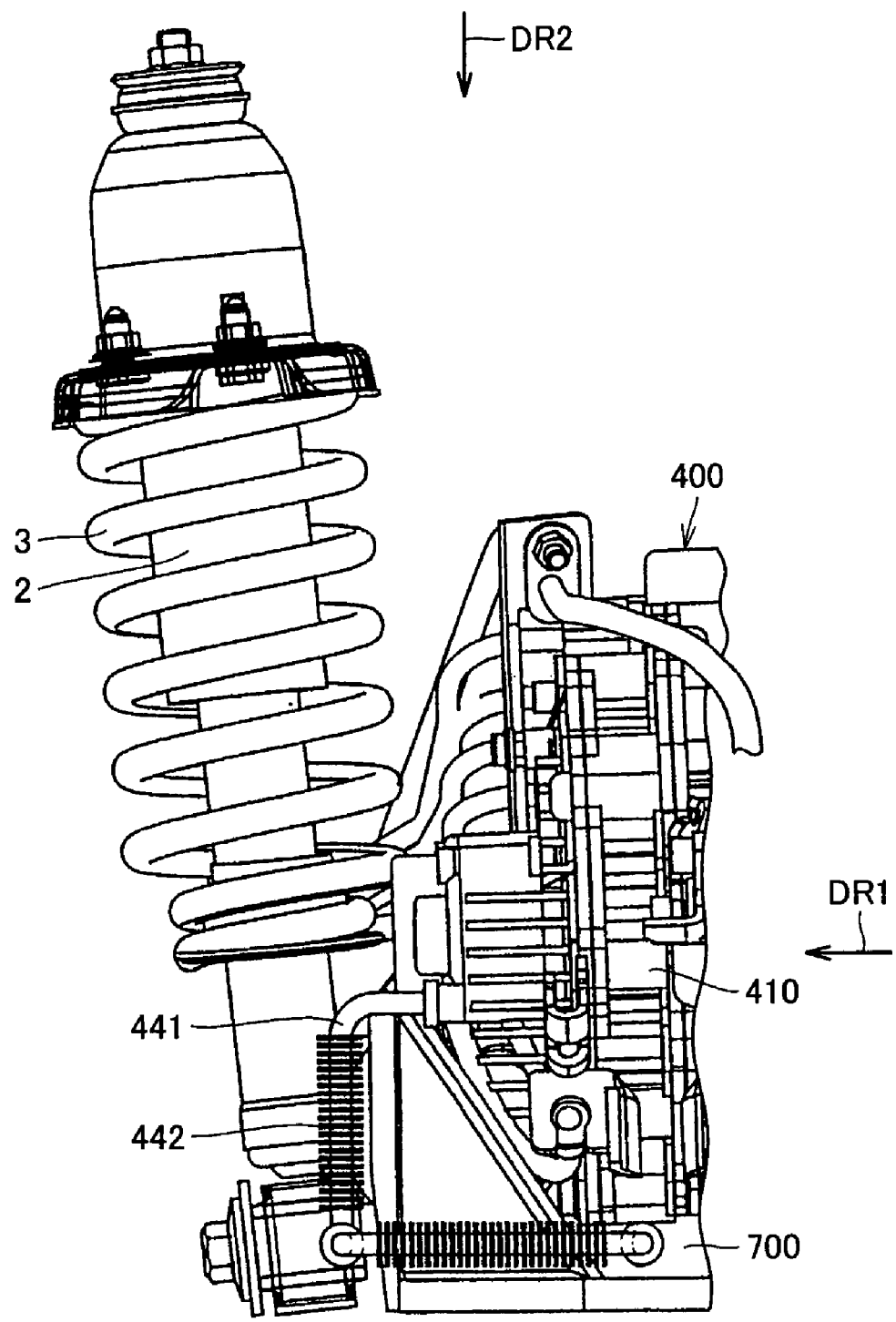
FIG. 5 shows a state of the cooling structure for the in-wheel motor in accordance with the first embodiment of the present invention when seen from the rear side of the vehicle.
Figure 6:
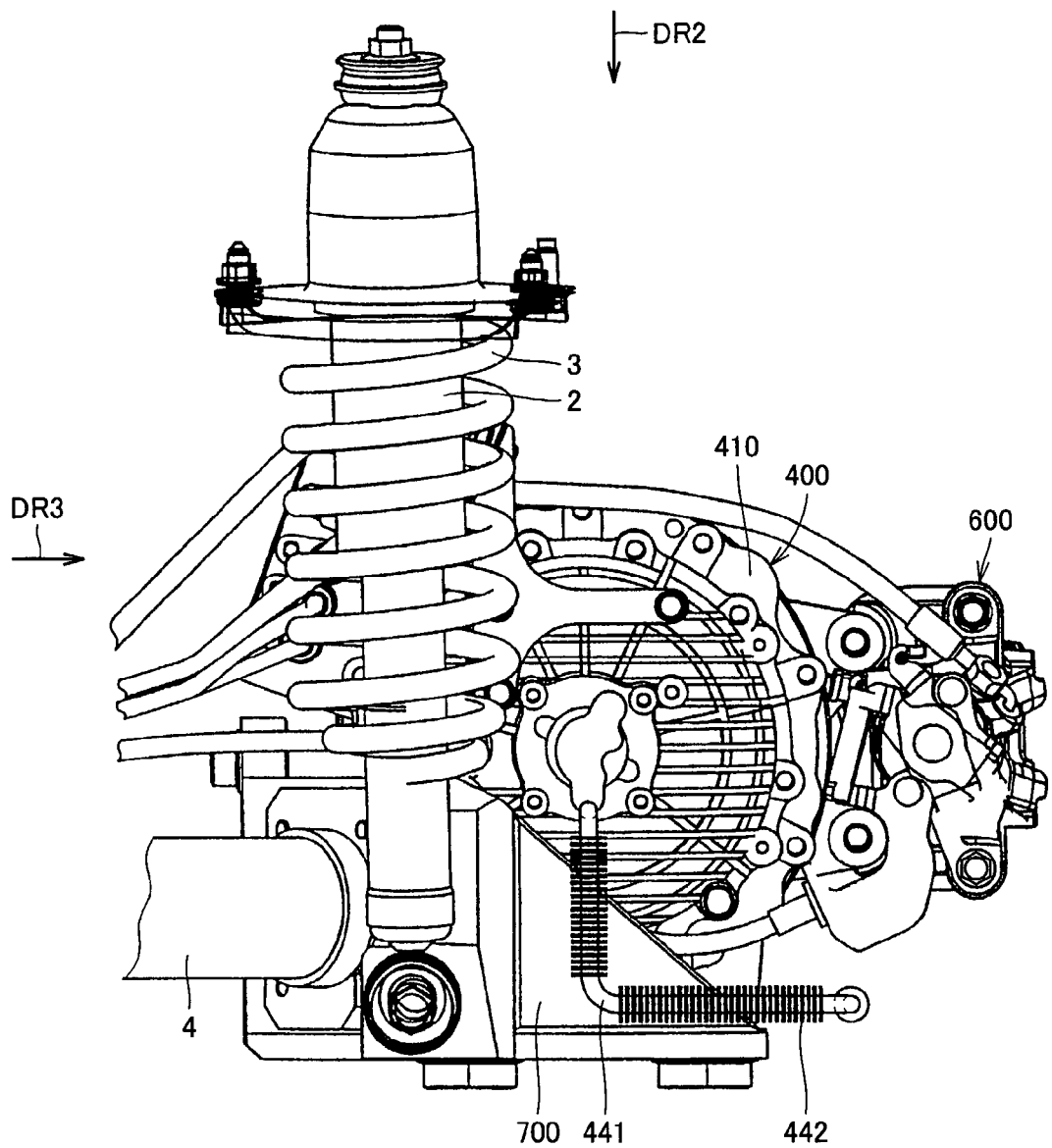
FIG. 6 shows a state of the cooling structure for the in-wheel motor in accordance with the first embodiment of the present invention when seen from the inside of the lateral side of the vehicle.

FIGS. 5 and 6 show a cooling structure for an in-wheel motor in accordance with a first embodiment. Here, FIG. 5 shows a state of the cooling structure when seen from the rear side of the vehicle (from a direction opposite to the direction indicated by arrow DR3), and FIG. 6 shows a state of the cooling structure when seen from the inside of the lateral side of the vehicle (from a direction opposite to the direction indicated by arrow DR1).

Referring to FIGS. 5 and 6, in-wheel motor 400 has oil channel 441 as the "cooling medium channel" provided such that at least a portion thereof passes through the outside of case 410. The portion of oil channel 441 located outside case 410 is provided with fin 442. In the cooling structure in accordance with the present embodiment, oil channel 441 and fin 442 located outside case 410 constitute the "heat radiating portion" to facilitate the cooling of in-wheel motor 400.

The above arrangement allows the oil contributing to the cooling of in-wheel motor 400 to flow outside case 410. Consequently, by providing oil channel 441 at a location readily receiving cooling wind (that is, a location having a relatively good cooling condition), heat radiation from the oil flowing through oil channel 411 can be facilitated, improving cooling efficiency of in-wheel motor 400 by the oil.

As described above, in the cooling structure for in-wheel motor 400 in accordance with the present embodiment, oil channel 441 and fin 442 as the "heat radiating portion" are located apart from case 410 as the "housing".

Second Embodiment

Figure 7:
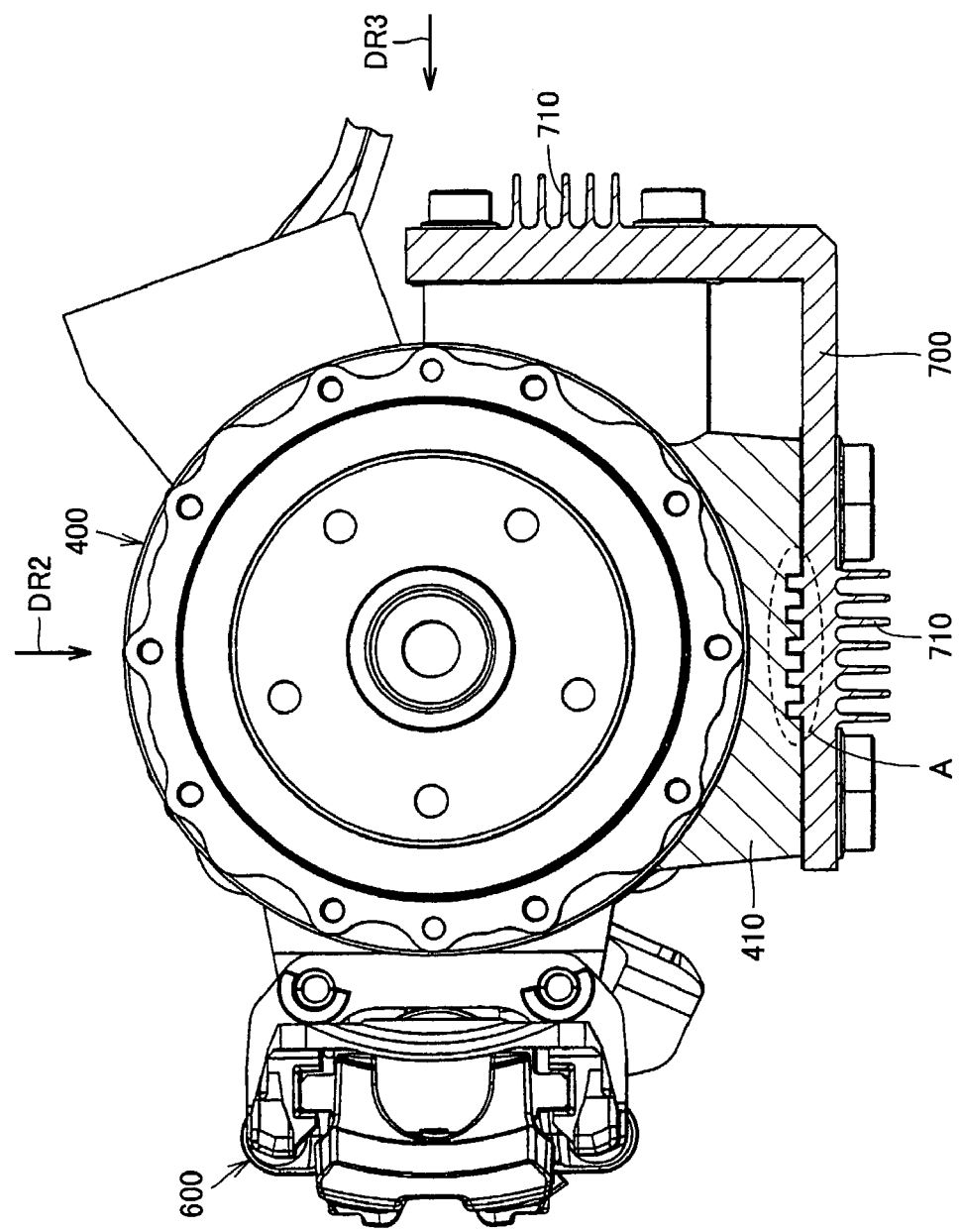
FIG. 7 shows a state of the cooling structure for the in-wheel motor in accordance with the second embodiment of the present invention when seen from the outside of the lateral side of the vehicle.
Figure 8:
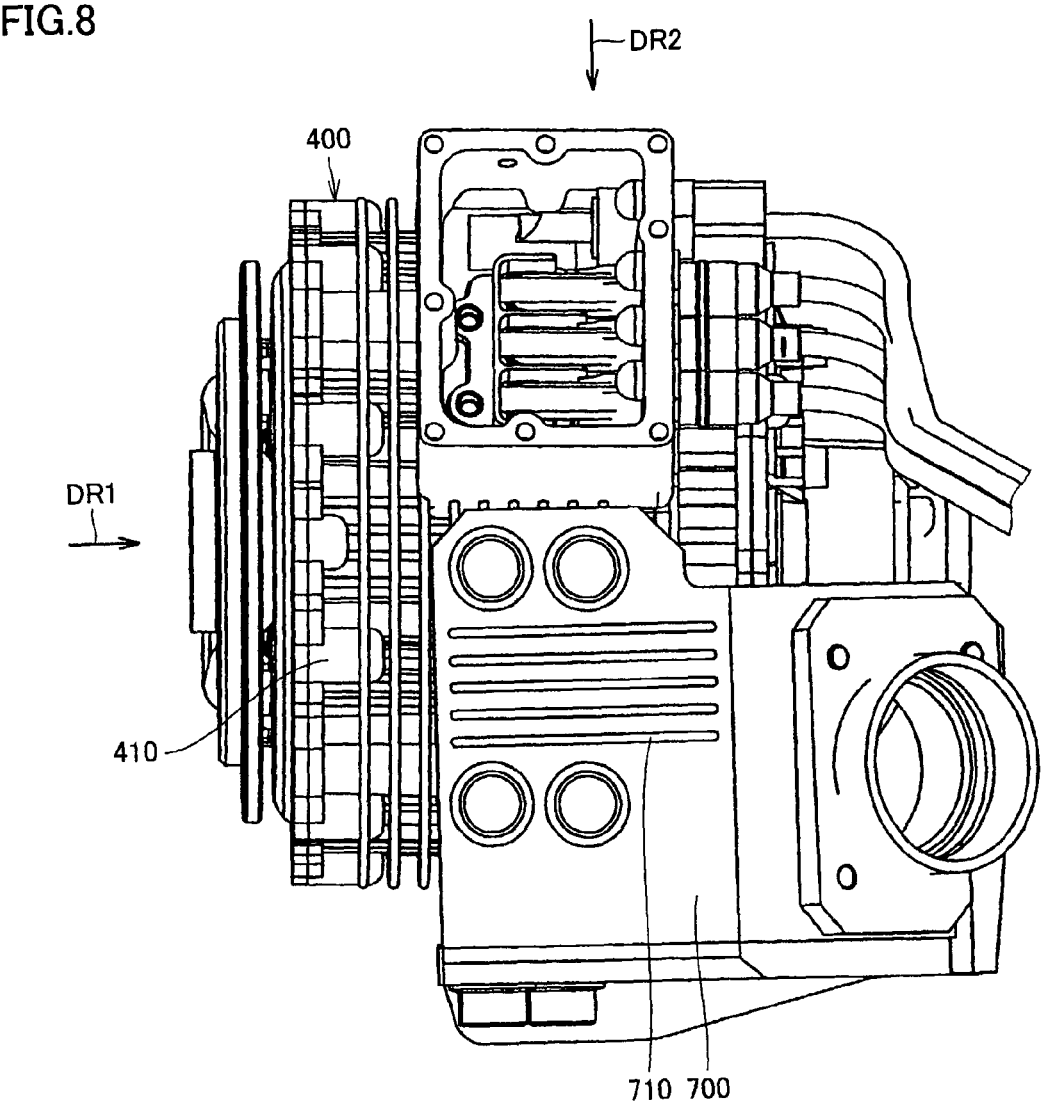
FIG. 8 shows a state of the cooling structure for the in-wheel motor in accordance with the second embodiment of the present invention when seen from the front side of the vehicle.

FIGS. 7 and 8 show a cooling structure for an in-wheel motor in accordance with a second embodiment. Here, FIG. 7 shows a state of the cooling structure when seen from the outside of the lateral side of the vehicle (from the direction indicated by arrow DR1), and FIG. 8 shows a state of the cooling structure when seen from the front side of the vehicle (from the direction indicated by arrow DR3).

Referring to FIGS. 7 and 8, in-wheel motor 400 is assembled to the vehicle via mounting bracket 700, and mounting bracket 700 is provided with fin 710. In the cooling structure in accordance with the present embodiment, fin 710 constitutes the "heat radiating portion" to facilitate the cooling of the in-wheel motor. Further, the contact surface between case 410 and mounting bracket 700 is provided with a portion having protrusions (a portion A in FIG. 7) to increase a contact area therebetween. Furthermore, case 410 and mounting bracket 700 are in contact with each other via a material for facilitating heat transfer including a material having a relatively high heat transfer coefficient such as silicon grease.

With the above arrangement, cooling efficiency of in-wheel motor 400 can be improved by heat radiation from mounting bracket 700. Since mounting bracket 700 is a member blocking a portion of cooling wind toward case 410, cooling of in-wheel motor 400 can be facilitated effectively by enhancing heat radiation via the bracket. Further, with the material for facilitating heat transfer described above, heat transfer from case 410 of in-wheel motor 400 to mounting bracket 700 can have an improved efficiency. As a result, the heat radiation via mounting bracket 700 can further be enhanced.

Figure 9:
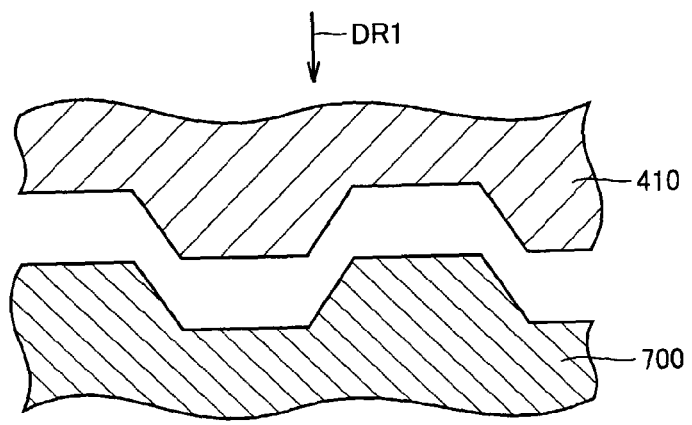
FIG. 9 shows a modification of the cooling structure for the in-wheel motor in accordance with the second embodiment of the present invention.

FIG. 9 shows a modification of the portion having protrusions described above. As shown in FIG. 9, by forming the portion to have trapezoidal protrusions, the portion having such protrusions can also be utilized as an inlay portion (a positioning portion) when in-wheel motor 400 is assembled to mounting bracket 700.

The shape of the portion having protrusions formed on the contact surface between case 410 and mounting bracket 700 is not limited to those described above, and can be modified as appropriate as long as the shape increases the contact area between case 410 and mounting bracket 700. For example, the portion having protrusions may be shaped like a wave.

As described above, in the cooling structure for in-wheel motor 400 in accordance with the present embodiment, fin 710 as the "heat radiating portion" is located apart from case 410 as the "housing".

Third Embodiment

Figure 10:
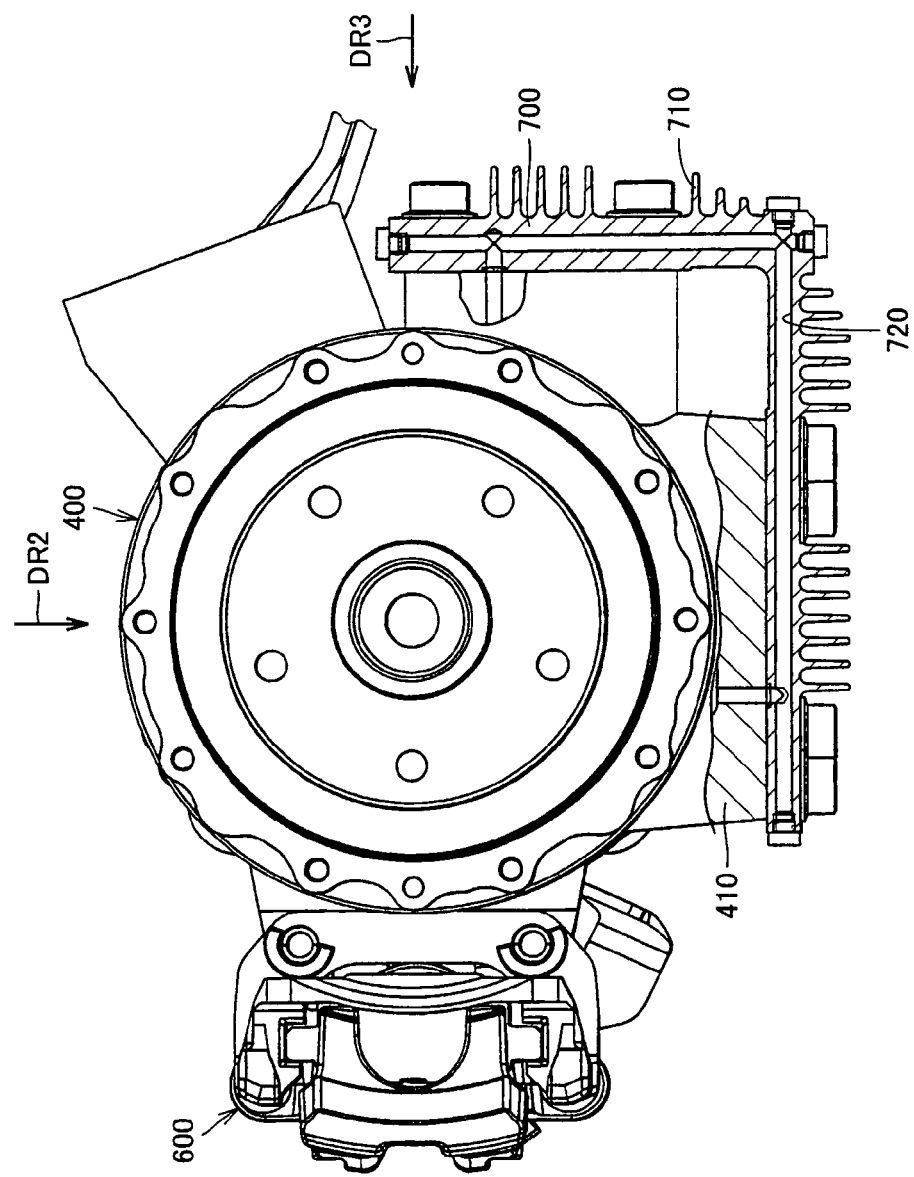
FIG. 10 shows a state of the cooling structure for the in-wheel motor in accordance with the third embodiment of the present invention when seen from the outside of the lateral side of the vehicle.
Figure 11:
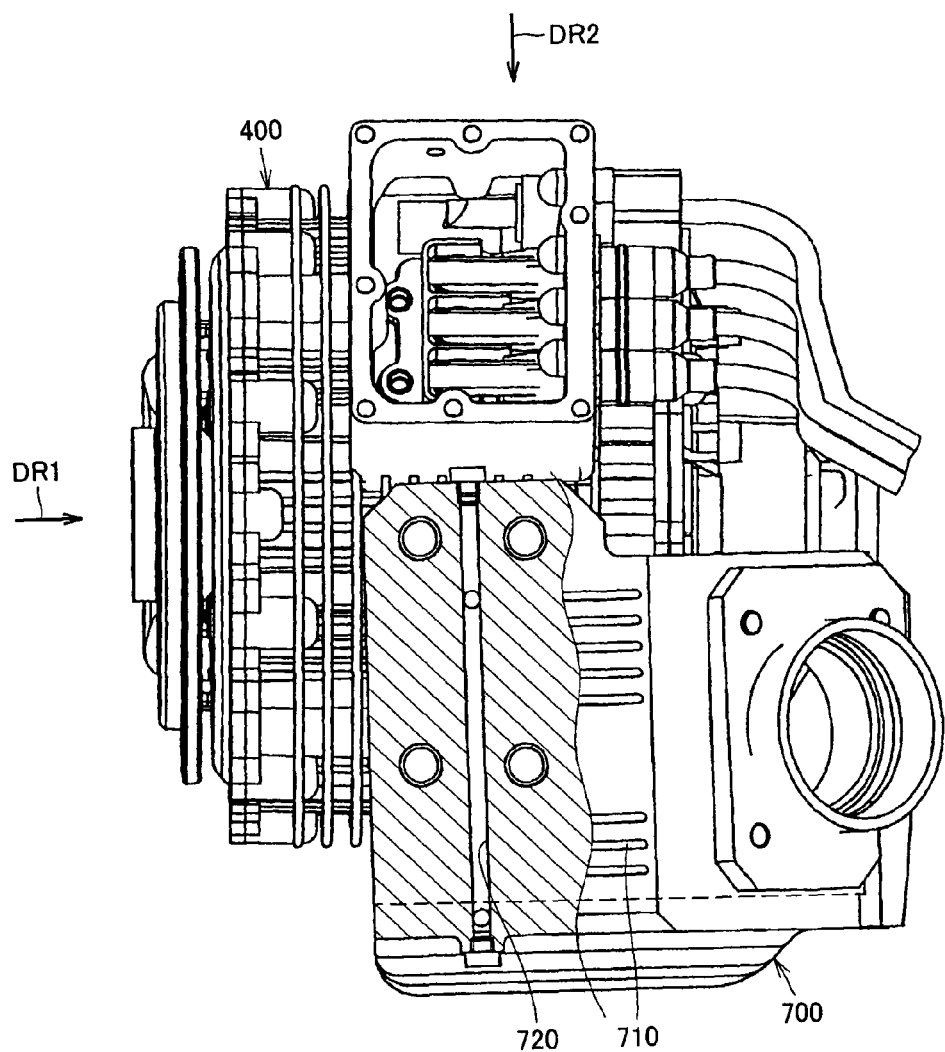
FIG. 11 shows a state of the cooling structure for the in-wheel motor in accordance with the third embodiment of the present invention when seen from the front side of the vehicle.

FIGS. 10 and 11 show a cooling structure for an in-wheel motor in accordance with a third embodiment. Here, FIG. 10 shows a state of the cooling structure when seen from the outside of the lateral side of the vehicle (from the direction indicated by arrow DR1), and FIG. 11 shows a state of the cooling structure when seen from the front side of the vehicle (from the direction indicated by arrow DR3).

Referring to FIGS. 10 and 11, in-wheel motor 400 is assembled to the vehicle via mounting bracket 700, and mounting bracket 700 is provided with fin 710. Mounting bracket 700 is also provided with oil channel 720 as the "cooling medium channel". Specifically, oil channel 720 goes through the inside of mounting bracket 700.

As described above, the oil pumped out of oil pump 440 provided within case 410 of in-wheel motor 400 flows into case 410 again via oil channel 720 located outside case 410, contributing to the cooling of each portion of in-wheel motor 400. Consequently, according to the cooling structure in accordance with the present embodiment, cooling of the oil flowing through oil channel 720 can be facilitated by heat radiation from mounting bracket 700. That is, with the above arrangement, cooling efficiency of in-wheel motor 400 by the oil can be improved.

As described above, in the cooling structure for in-wheel motor 400 in accordance with the present embodiment, fin 710 and oil channel 720 as the "heat radiating portion" are located apart from case 410 as the "housing".

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Industrial Applicability

As has been described, the present invention is applied to a cooling structure for an in-wheel motor.

The invention claimed is:

1. A cooling structure for an in-wheel motor, comprising:
    an in-wheel motor having at least a portion mounted within a wheel of a vehicle to drive the wheel or to be driven by the wheel;
    said in-wheel motor having a housing that completely accommodates both a rotor and a stator of the in-wheel motor;
    a heat radiating portion to facilitate cooling of said in-wheel motor; and
    a mounting bracket for assembling said in-wheel motor to a wheel supporting unit of the vehicle, the wheel supporting unit comprising a shock absorber, said mounting bracket being fixed to said in-wheel motor and contacting said housing of the in-wheel motor, wherein
    said heat radiating portion includes a cooling fin disposed on said mounting bracket,
    the mounting bracket is a unitary structure separate from the housing for mounting the housing directly to the wheel supporting unit,
    the mounting bracket includes a first surface located on a front side of the in-wheel motor and a second surface located on a lower side of the in-wheel motor, the first and second surfaces contact each other and are angled with respect to each other in a non-continuous manner, and
    a plurality of the cooling fins are provided on each of the first and second surfaces.

2. The cooling structure for an in-wheel motor according to claim 1, wherein a contact surface between said housing and said mounting bracket is provided with a portion having protrusions to increase a contact area.

3. The cooling structure for an in-wheel motor according to claim 1, wherein
    said in-wheel motor has a cooling medium channel having at least a portion thereof provided to pass through an outside of said housing, and
    said heat radiating portion includes the portion of said cooling medium channel located outside said housing.

4. The cooling structure for an in-wheel motor according to claim 3, wherein
    said cooling medium channel goes through an inside of said mounting bracket.

5. The cooling structure for an in-wheel motor according to claim 3, wherein said cooling medium channel extends from an inner lateral side of said in-wheel motor through the outside of said housing toward a rear side of said in-wheel motor.

* * * * *

UNITED STATES PATENT AND TRADEMARK OFFICE
CERTIFICATE OF CORRECTION

PATENT NO. : 8,251,167 B2  Page 1 of 1
APPLICATION NO. : 11/887824
DATED : August 28, 2012
INVENTOR(S) : Naoki Moriguchi et al.

It is certified that error appears in the above-identified patent and that said Letters Patent is hereby corrected as shown below:

ON THE TITLE PAGE:

Item 87 should read

> PCT Pub. No.: WO2006/115133
> PCT Pub. Date: ~~Nov. 2, 2009~~ Nov. 2, 2006

Signed and Sealed this
First Day of January, 2013

David J. Kappos
*Director of the United States Patent and Trademark Office*